(12) United States Patent
Sambongi et al.

(10) Patent No.: US 12,363,247 B2
(45) Date of Patent: Jul. 15, 2025

(54) IMAGE SENSOR HAVING BLACK LEVEL CORRECTION

(71) Applicant: OmniVision Technologies, Inc., Santa Clara, CA (US)

(72) Inventors: Masao Sambongi, Fremont, CA (US); Nobuhiro Yanagisawa, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 408 days.

(21) Appl. No.: 18/168,630

(22) Filed: Feb. 14, 2023

(65) Prior Publication Data

US 2024/0275906 A1    Aug. 15, 2024

(51) Int. Cl.
  *H04N 5/16*    (2006.01)
  *G06V 10/60*   (2022.01)

(52) U.S. Cl.
  CPC ............. *H04N 5/165* (2013.01); *G06V 10/60* (2022.01)

(58) Field of Classification Search
  CPC ...... H04N 25/57; H04N 25/705; H04N 25/77; H04N 25/771; H04N 25/78; G01S 7/4863; G01S 17/08; G02B 2027/0178; G02B 2027/014; H02J 7/0063; H02J 7/345
  See application file for complete search history.

(56) References Cited

U.S. PATENT DOCUMENTS

| | | | |
|---|---|---|---|
| 8,885,075 B2 | 11/2014 | Kanemitsu et al. | |
| 9,520,424 B2 | 12/2016 | Jangjian et al. | |
| 9,565,378 B2 | 2/2017 | Takahashi et al. | |
| 10,819,927 B1 | 10/2020 | Mikes | |
| 2019/0191120 A1* | 6/2019 | Ikedo | H04N 25/771 |

* cited by examiner

*Primary Examiner* — Xi Wang

(57) ABSTRACT

An image sensor includes a pixel array including at least one light-shielded area where no light enters and an imaging area where light enters, wherein each pixel includes a photoelectric conversion element, a black level processing unit that corrects an output of each pixel in the imaging area, and a memory that stores a predetermined black level reference for each pixel in the imaging area. The processing unit calculates a Slope, which is determined by an average output value at imaging of pixels in the at least one light-shielded area taken during imaging and a reference average output value of pixels in the at least one light-shielded area under certain conditions taken prior to imaging, and correct an output of each pixel in the imaging area using the predetermined black level reference and the Slope.

16 Claims, 4 Drawing Sheets

IMAGE SENSOR HAVING BLACK LEVEL CORRECTION

FIELD OF THE INVENTION

This disclosure relates to image sensors, and particularly image sensors having black level correction.

BACKGROUND OF THE INVENTION

The black level of an image sensor is set using the output of a light-shielded area during imaging or prior to imaging. Here, the image sensor may contain not only a photodiode array but also a signal processing circuit. Recently, semiconductor chips increasingly have a multi-layered structure, with signal processing circuits often being placed on the layer below the image sensor.

Signal processing circuits generate heat during their operation, and the amount of heat varies depending on the load on the signal processing circuits. The black level varies in accordance with heat, so the black level of the image sensor varies depending on the load on the signal processing circuit, and its position, which is difficult to compensate for and/or to correct. Accordingly, image sensors having black level correction in response to the heat variation are demanded.

SUMMARY

The below summary is merely representative and non-limiting. The above problems are overcome, and other advantages may be realized, by the use of the embodiments.

The image sensor according to the present disclosure comprises: a pixel array including at least one light-shielded region where light does not enter, and an imaging area where light enters, a black level processing unit that corrects an output of each pixel in the imaging area of the pixel array, and a memory that stores a predetermined black level reference for each pixel in the imaging area of the pixel array, where the processing unit is configured to calculate Slope, which is determined by an average output value at imaging of pixels in the at least one light-shielded area taken during imaging and a reference average output value of pixels in the at least one light-shielded area under certain conditions taken prior to imaging, and correct an output of each pixel in the imaging area using the predetermined black level reference and Slope.

In an embodiment, Slope is determined by average output values at imaging of pixels in two light-shielded areas, respectively, taken during imaging and reference average output values of pixels in the two light-shielded areas under certain conditions, respectively, taken prior to imaging.

According to this disclosure, appropriate black level correction can be performed in response to the temperature distribution or variation and temperature change over the image sensor.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
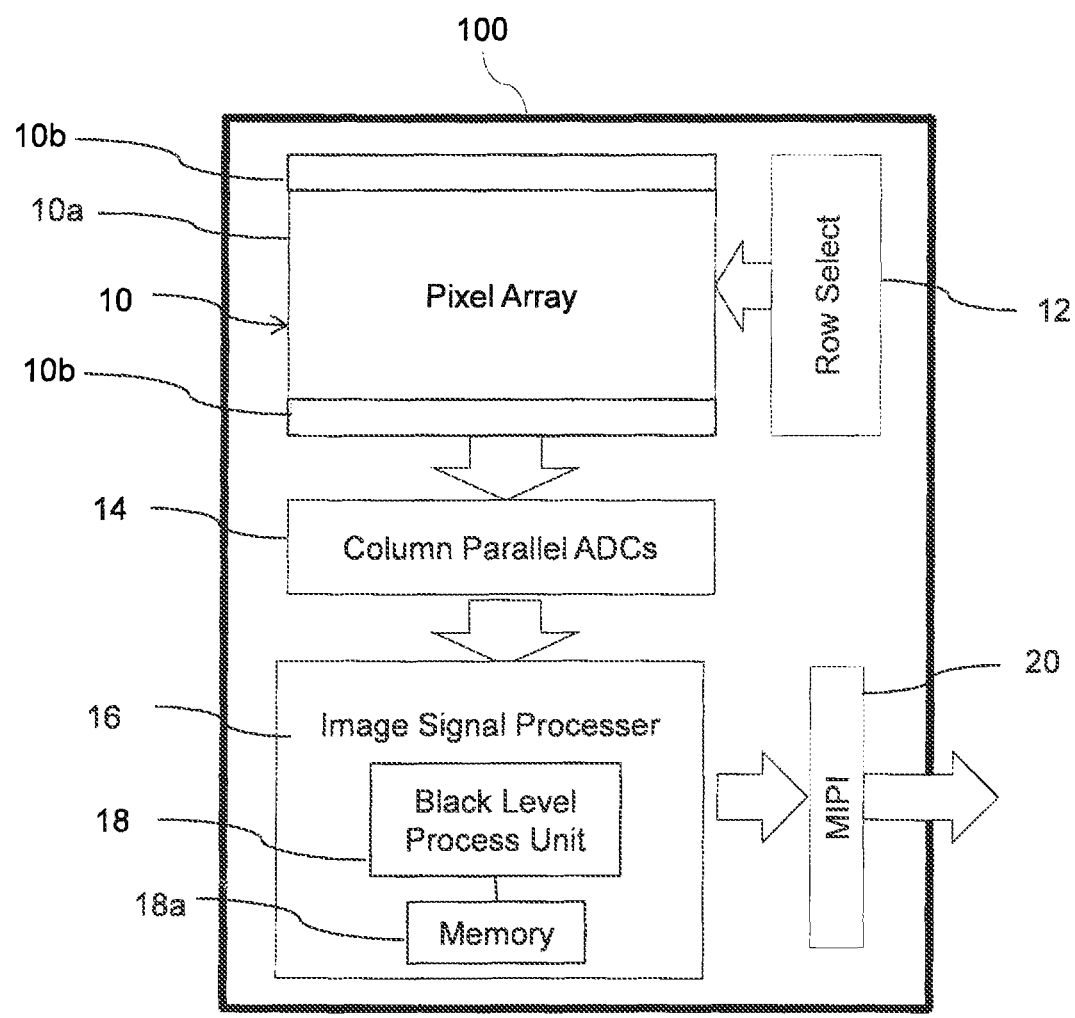
FIG. 1 is a block diagram of an image sensor.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 is a block diagram of the image sensor 100 of an embodiment. The image sensor 100 in this embodiment is mounted on a single semiconductor chip. The image sensor 100 has a pixel array 10. The pixel array 10 includes pixels arranged in a matrix. Each pixel includes a photodiode (PD) as a photoelectric conversion element. Here, the pixel array 10 has an imaging area 10*a* in the center where light enters, and light-shielded areas 10*b*, where no light enters, these areas being located next to the top and bottom edges. The pixel array 10 includes at least one light-shielded area 10*b*, where light does not enter, and an imaging area 10*a*, where light enters, wherein each pixel of the pixel array 10 includes a photoelectric conversion element. The at least one light-shielded area may include two light-shielded areas at two locations next to the imaging area. The light-shielded area at one location and the light-shielded area at another location may be located across the imaging area as shown in FIG. 1.

A row select circuit 12 and a column parallel ADC 14 are connected to the pixel array 10. The row select circuit 12 selects a row of pixels in the pixel array 10 and causes analog signals from each pixel in that row to be output to the corresponding column bit lines. The column parallel ADC 14 converts the analog signals supplied from the bit lines of each column into output digital signals (image signals), respectively.

Accordingly, image signals (output digital signals) from the pixels in the selected rows are output from the column parallel ADC 14 in parallel. In the row select circuit 12, a row is selected sequentially, and when all rows have been selected, the image signals of one frame will be output from the column parallel ADC 14.

The image signals from the column parallel ADC 14 are supplied to an image signal processor (ISP) 16, where they are processed in various ways. In this embodiment, the image signal processor 16 has a black level processing unit 18, and the image signals are corrected in the black level processing unit 18, e.g., from IN(x,y) to OUT(x,y), as will be discussed later. A memory 18a is connected to the black level processing unit 18. In the memory 18a, a predetermined black level reference for each pixel that has been determined in advance is stored in a look-up table, e.g., LUT(x,y), as will be discussed later. The black level processing unit 18 is for correcting an output of each pixel in the imaging area of the pixel array. A memory is for storing a predetermined black level reference for each pixel in the imaging area of the pixel array.

Image signals, e.g., OUT(x,y), obtained in the image signal processor 16 are supplied to an MIPI (Mobile Industry Processor Interface) 20 and output in a predetermined manner. The output digital signal, e.g., OUT(x,y), is, for example, transmitted to external devices or displayed on a display. The words "image signal", "output digital signal", and simply "output" are used interchangeably throughout the disclosure.

Figure 2:
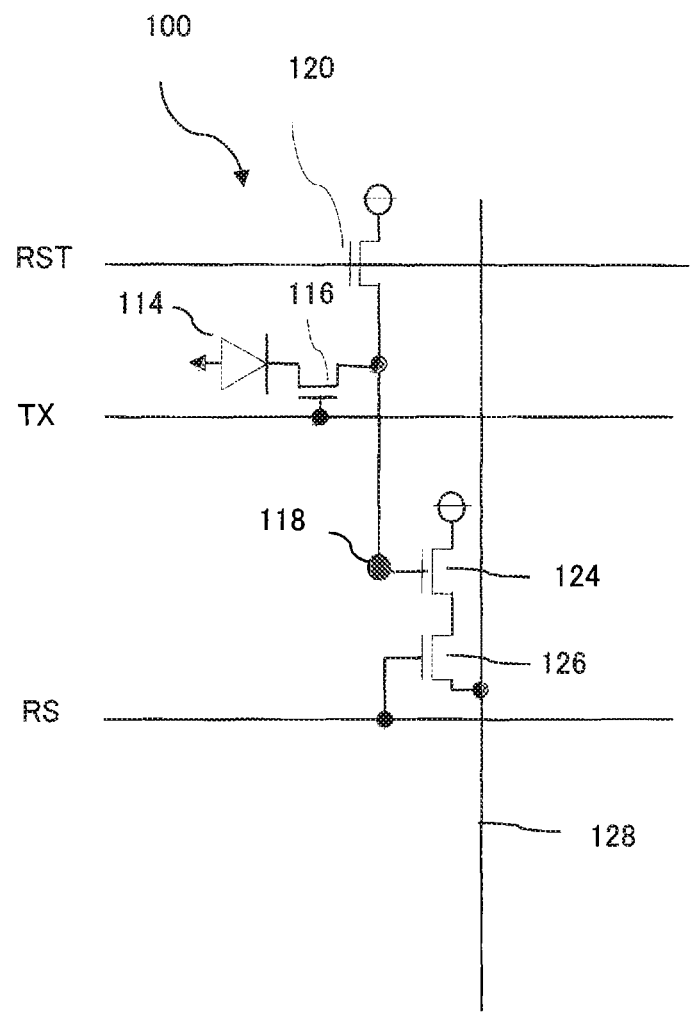
FIG. 2 shows a configuration of a single pixel.

FIG. 2 shows a configuration of a single pixel. In this example, the pixel has one photodiode 114. The photodiode 114 is connected via a transfer transistor 116 to a floating diffusion 118 having a predetermined capacitance. The floating diffusion 118 stores the charge transferred from the photodiode 114. The floating diffusion 118 is connected to the gate of the source follower transistor 124. The drain of the source follower transistor 124 is connected to the power supply, and the source is connected to the drain of the row selection transistor 126.

The gate of the row selection transistor 126 is connected to the row selection line RS, and the source of the row selection transistor 126 is connected to the bit line 128. When the row selection line RS is high, the row selection transistor 126 is on and a voltage of the bit line (image signal) is set in accordance with the voltage of the floating diffusion 118.

The gate of the reset transistor 120 is connected to the reset line RST. The drain of the reset transistor 120 is connected to the power supply and the source is connected to the source of the transfer transistor 116 and the floating diffusion 118. When the reset line RST is high, the floating diffusion is reset, i.e. a voltage of the floating diffusion becomes the voltage of the power source.

First, the reset line RST is set high, and the reset transistor 120 turns on and resets the floating diffusion 118. This also puts the output of the source follower transistor 124 on and the bit line 128 is reset. Next, after RST returns to low, and after a predetermined exposure time, the transfer control line TX is turned on. This turns on transfer transistor 116, and the stored charge of photodiode 114 is read out through the floating diffusion 118 to bit line 128 as an analog image signal.

The digital signal converted from the analog image signal read out on bit line 128 as described above is processed in image signal processor (ISP) 16. Here, the image signal processor 16 has a black level processing unit 18, where the black level is set.

In particular, in this system, a reference for the black level (predetermined black level reference, e.g., LUT(x,y)) is stored in memory 18a for each pixel in the pixel array 10. For example, when the power is turned on, image signals (black levels) of all pixels are captured under conditions where no light is incident, and these are stored in memory 18a by mapping them in connection with pixel positions.

Then, for an output from each pixel at the time of imaging (at imaging), a black level compensated and/or corrected output, e.g., OUT(x,y), may be obtained using the predetermined black level reference stored in memory 18a.

Figure 3:
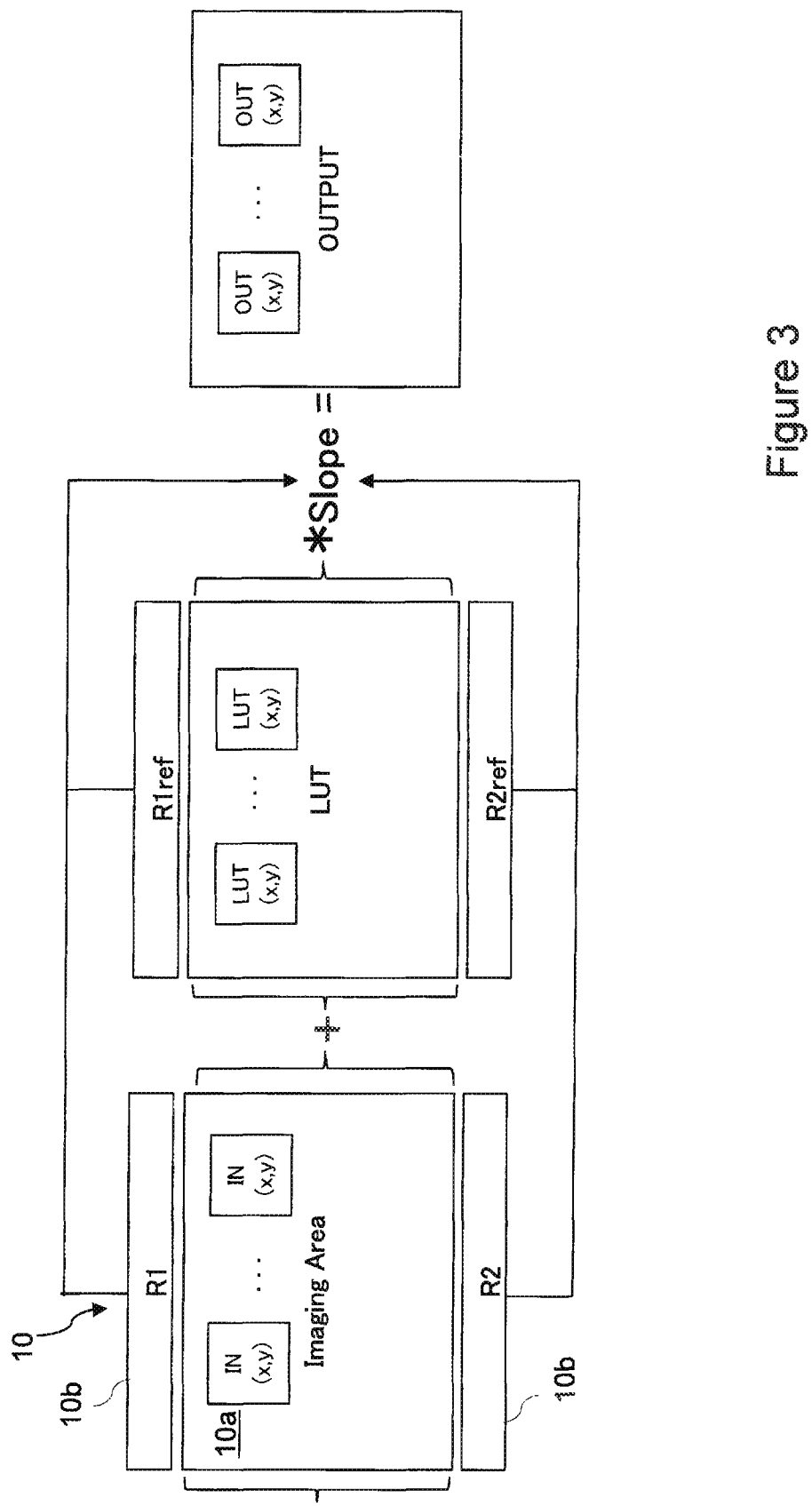
FIG. 3 shows a process of correcting an output.

FIG. 3 shows the process of correcting an output OUT (x,y). In an embodiment, the at least one light-shielded area includes two light-shielded areas at two locations next to the imaging area. The output OUT(x, y) of each pixel in the imaging area may be obtained by the following formula:

$$OUT(x, y) = \{IN(x, y) - AVG(R1, R2)\} +$$
$$\{LUT(x, y) - AVG(R1ref, R2ref)\} * \text{Slope} + C.$$

Here, the meanings of the above terms are as follow.

IN(x,y) is an output at imaging from a pixel at a coordinate (x,y) in the imaging area. It is the value before correction. IN(x,y) is a value corresponding to the incident light level at the pixel (x,y), which relates to the amount of charge generated in the photodiode of the pixel, or a voltage value corresponding to the amount of charge in the floating diffusion. When no light is incident, the value represents the black level, and when light is incident, the value is the incident light amount plus the black level.

AVG(R1,R2) is an average output value at imaging of pixels in the two light-shielded areas taken during imaging. AVG(R1,R2) should be an average value of the black level, which is the output of pixels in the light-shielded area.

LUT(x,y) is a predetermined black level reference for each pixel in the imaging area stored in memory 18a. It is measured under certain conditions. For example, it may be the value when the image is captured under the condition of maximum heat generation, such as at the maximum frame rate. The maximum frame rate is, for example, 24 fps (frames per second), in which case the heat generation of the signal processing circuit becomes large.

AVG(R1ref,R2ref) is an reference average output value of pixels in the two light-shielded areas under certain conditions taken prior to imaging. Since the value for each pixel is not necessary, only the average value may be stored in memory 18a.

In an embodiment, Slope is {AVG(R2)−AVG(R1)}/{(AVG(R2ref)−AVG(R1ref)}, where AVG(R1) is an average output value at imaging of pixels in one of the two light-shielded areas (R1) taken during imaging, and AVG(R2) is an average output value at imaging of pixels in another one of the two light-shielded areas (R2) taken during imaging, AVG(R1ref) is a reference average output value of pixels in one of the two light-shielded areas (R1) under certain conditions taken prior to imaging, and AVG(R2ref) is a reference average output value of pixels in another one of the two light-shielded areas (R2) under certain conditions taken prior to imaging.

C is a constant not shown in FIG. 3. The constant C is an adjustment value to be set so that the black level value is appropriate in signal processing.

The memory 18a may store {LUT(x,y)−AVG(R1ref, R2ref)} for each pixel.

In this way, in an embodiment, the above equation can be used to obtain the output OUT(x, y) with the black level corrected at the time of imaging. In particular, Slope, which is a variable, is used in this system. Slope is the ratio of the value {AVG(R2)−AVG(R1)} at the time of imaging to the value {AVG(R2ref)−AVG(R1ref)} in the certain state (reference state), and so represents the deviation of the values (e.g., black levels) of the light-shielded areas at different positions (in this case, a deviation between top and bottom areas). If the value of the deviation {AVG(R2)−AVG(R1)} at the time of imaging is smaller, the value of Slope will also be smaller, and the amount of black level correction will also be smaller.

The black level processing unit 18 may correct an output of each pixel in the imaging area using the preference black level reference (e.g., LUT(x,y)) and Slope. Slope may be calculated by the black level processing unit 18, which is determined by an average output value at imaging of pixels in the at least one light-shielded area of the pixel array taken during imaging and a reference average output value of pixels in the at least one light-shielded area of the pixel array under certain conditions taken prior to imaging.

In an embodiment, Slope is determined by average output values at imaging of pixels in two light-shielded areas, respectively, taken during imaging and reference average output values of pixels in the two light-shielded areas under certain conditions, respectively, taken prior to imaging.

When the temperature of the pixel array 10 is non-uniform due to heat from the signal processing circuitry located below the pixel array 10, the temperature on one location of the pixel array 10 will be higher and the temperature on the other location will be lower. Therefore, the degree of influence of the heat generated by the signal processing circuitry in the pixel array 10 can be evaluated by the black level of the light-shielded areas (R1, R2) located at two peripheral locations of the pixel array 10.

As used in this example, it is suitable to use light-shielded regions located next to two opposite sides of the pixel array 10. In the case that four light-shielded areas are located next to each side of the pixel array 10, the average of the two Slopes detected from the top and bottom, or left and right, light-shielded areas may be used, or the larger value may be adopted.

Figure 4:
FIG. 4 illustrates a photograph demonstrating an example of temperature distribution or variation over a pixel array of an image sensor.

FIG. 4 illustrates a photograph demonstrating an example of temperature distribution or variation over the pixel array 10 of the image sensor 100. In the figure, bright areas are areas with high temperatures. In this example, the temperature is high in the lower right region. In such a case, black level correction using the Slope as described above is effective.

In the above explanation, in an embodiment, Slope was calculated by the following formula:

$$\text{Slope} = \{AVG(R2) - AVG(R1)\}/\{AVG(R2ref) - AVG(R1ref)\}.$$

However, in an embodiment, the following equation may be used to make corrections as well:

$$\text{Slope} = \{AVG(R2) + AVG(R1)\}/\{AVG(R2ref) + AVG(R1ref)\}.$$

Slope may be calculated using both two formulae mentioned above, and the user may select one of them. For example, the system may be configured to accept and set a signal from an external source to select one of the two Slopes. The system may output images using both Slopes, and then select one of them by an external instruction.

Also, in the above, in an embodiment, the following formula was used.

$$\{IN(x, y) - AVG(R1, R2)\} + \{LUT(x, y) - AVG(R1ref, R2ref)\}.$$

However, in an embodiment, the following may be more appropriate depending on the values stored in memory 18*a*.

$$\{IN(x, y) - AVG(R1, R2)\} - \{LUT(x, y) - AVG(R1ref, R2ref)\}.$$

The user may compare two results from these two formulae and select one of them.

Thus, the output OUT(x,y) of each pixel in the imaging area may be obtained by the following formula:

$$OUT(x, y) =$$
$$\{IN(x, y) - AVG(R1, R2)\} - \{LUT(x, y) - AVG(R1ref, R2ref)\} * \text{Slope} + C.$$

Similarly, Slope may be calculated using both two formulae mentioned above, and the user may select one of them.

Also, Slope should not normally be large. In other words, it may be considered to be a few 10% of "1". Therefore, it is recommended to set an upper and lower limit for Slope, and cancel the black level correction or issue a warning if Slope exceeds the limit. For example, Slope has a lower limit of 5% and a upper limit of 30%.

While the present invention has been described herein with respect to the exemplary embodiments and the best mode for practicing the invention, it will be apparent to one of ordinary skill in the art that many modifications, improvements and sub-combinations of the various embodiments, adaptations, and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor comprising:
   a pixel array including at least one light-shielded area where light does not enter and an imaging area where light enters, wherein each pixel of the pixel array includes a photoelectric conversion element;
   a black level processing unit for correcting an output of each pixel in the imaging area of the pixel array; and
   a memory for storing a predetermined black level reference for each pixel in the imaging area of the pixel array;
   wherein the black level processing unit is configured to:
   calculate a Slope, which is determined by an average output value at imaging of pixels in the at least one light-shielded area of the pixel array taken during imaging and a reference average output value of pixels in the at least one light-shielded area of the pixel array under certain conditions taken prior to imaging; and
   correct the output of each pixel in the imaging area using the predetermined black level reference and the Slope.

2. The image sensor according to claim 1, wherein the value of Slope has a lower limit and a upper limit.

3. The image sensor according to claim 2, wherein the lower limit of the value of Slope is 5% and the upper limit of the value of slope is 30%.

4. The image sensor according to claim 1, wherein the at least one light-shielded area includes two light-shielded areas at two locations next to the imaging area, and the light-shielded area at one location and the light-shielded area at another location are located across the imaging area.

5. The image sensor according to claim 4, wherein the output of each pixel in the imaging area is corrected by the black level processing unit using following equation:

$$OUT(x, y) = \{IN(x, y) - AVG(R1, R2)\} + \{LUT(x, y) - AVG(R1ref, R2ref)\} * \text{Slope} + C;$$

wherein:
  OUT(x,y) is the output of a pixel in the imaging area at a coordinate (x,y);
  IN(x,y) is an output before correction of the pixel at the coordinate (x,y);
  AVG(R1,R2) is the average output value at imaging of pixels in the two light-shielded areas taken during imaging;
  LUT(x,y) is the predetermined black level reference of the pixel at the coordinate (x,y);
  AVG(R1ref,R2ref) is the reference average output value of pixels in the two light-shielded areas under certain conditions taken prior to imaging; and
  C is a constant.

6. The image sensor according to claim 5, wherein the Slope is determined as:

$$\{AVG(R2) - AVG(R1)\}/\{(AVG(R2ref) - AVG(R1ref)\};$$

wherein:
  AVG(R1) is the average output value at imaging of pixels in one of the two light-shielded areas taken during imaging;
  AVG(R2) is the average output value at imaging of pixels in another one of the two light-shielded areas taken during imaging;
  AVG(R1ref) is the reference average output value of pixels in one of the two light-shielded areas under certain conditions taken prior to imaging; and
  AVG(R2ref) is the reference average output value of pixels in another one of the two light-shielded areas under certain conditions taken prior to imaging.

7. The image sensor according to claim 5, wherein the Slope is determined as:

$$\{AVG(R2) + AVG(R1)\}/\{(AVG(R2ref) + AVG(R1ref)\};$$

wherein:
  AVG(R1) is the average output value at imaging of pixels in one of the two light-shielded areas taken during imaging;
  AVG(R2) is the average output value at imaging of pixels in another one of the two light-shielded areas taken during imaging;
  AVG(R1ref) is the reference average output value of pixels in one of the two light-shielded areas under certain conditions taken prior to imaging; and
  AVG(R2ref) is the reference average output value of pixels in another one of the two light-shielded areas under certain conditions taken prior to imaging.

8. The image sensor according to claim 4, wherein the output of each pixel in the imaging area is corrected by the black level processing unit using following equation:

$$OUT(x, y) = \{IN(x, y) - AVG(R1, R2)\} - \{LUT(x, y) - AVG(R1ref, R2ref)\} * \text{Slope} + C;$$

wherein:
  OUT(x,y) is the output of a pixel in the imaging area at a coordinate (x,y);
  IN(x,y) is an output before correction of the pixel at the coordinate (x,y);
  AVG(R1,R2) is the average output value at imaging of pixels in the two light-shielded areas taken during imaging;
  LUT(x,y) is the predetermined black level reference of the pixel at the coordinate (x,y);
  AVG(R1ref,R2ref) is the reference average output value of pixels in the two light-shielded areas under certain conditions taken prior to imaging; and
  C is a constant.

9. The image sensor according to claim 8, wherein the Slope is determined as:

$$\{AVG(R2) - AVG(R1)\}/\{(AVG(R2ref) - AVG(R1ref)\};$$

wherein:
  AVG(R1) is the average output value at imaging of pixels in one of the two light-shielded areas taken during imaging;
  AVG(R2) is the average output value at imaging of pixels in another one of the two light-shielded areas taken during imaging;
  AVG(R1ref) is the reference average output value of pixels in one of the two light-shielded areas under certain conditions taken prior to imaging; and
  AVG(R2ref) is the reference average output value of pixels in another one of the two light-shielded areas under certain conditions taken prior to imaging.

10. The image sensor according to claim 8, wherein the Slope is determined as:

$$\{AVG(R2) + AVG(R1)\}/\{(AVG(R2ref) + AVG(R1ref)\};$$

wherein:
  AVG(R1) is the average output value at imaging of pixels in one of the two light-shielded areas taken during imaging;
  AVG(R2) is the average output value at imaging of pixels in another one of the two light-shielded areas taken during imaging;
  AVG(R1ref) is the reference average output value of pixels in one of the two light-shielded areas under certain conditions taken prior to imaging; and
  AVG(R2ref) is the reference average output value of pixels in another one of the two light-shielded areas under certain conditions taken prior to imaging.

11. A method for correcting an output of a pixel of a pixel array of an image sensor, wherein the pixel array comprises an imaging area and two light-shielded areas across the imaging area and the pixel is in the imaging area, using following equation:

$$OUT(x, y) = \{IN(x, y) - AVG(R1, R2)\} + \{LUT(x, y) - AVG(R1ref, R2ref)\} * Slope + C;$$

wherein:
OUT(x,y) is an output of the pixel at a coordinate (x,y);
IN(x,y) is an output before correction of the pixel at the coordinate (x,y);
AVG(R1,R2) is an average output value at imaging of pixels in the two light-shielded areas taken during imaging;
LUT(x,y) is a predetermined black level reference of the pixel at the coordinate (x,y);
AVG(R1ref,R2ref) is a reference average output value of pixels in the two light-shielded areas under certain conditions taken prior to imaging;
Slope is determined by average output values at imaging of pixels in the two light-shielded areas, respectively, taken during imaging and reference average output values of pixels in the two light-shielded areas under certain conditions, respectively, taken prior to imaging; and
C is a constant.

12. The method according to claim 11, wherein the Slope is determined as:

$$\{AVG(R2) - AVG(R1)\}/\{(AVG(R2ref) - AVG(R1ref)\};$$

wherein:
AVG(R1) is an average output value at imaging of pixels in one of the two light-shielded areas taken during imaging;
AVG(R2) is an average output value at imaging of pixels in another one of the two light-shielded areas taken during imaging;
AVG(R1ref) is a reference average output value of pixels in one of the two light-shielded areas under certain conditions taken prior to imaging; and
AVG(R2ref) is a reference average output value of pixels in another one of the two light-shielded areas under certain conditions taken prior to imaging.

13. The method according to claim 11, wherein the Slope is determined as:

$$\{AVG(R2) + AVG(R1)\}/\{(AVG(R2ref) + AVG(R1ref)\};$$

wherein:
AVG(R1) is an average output value at imaging of pixels in one of the two light-shielded areas taken during imaging;
AVG(R2) is an average output value at imaging of pixels in another one of the two light-shielded areas taken during imaging;
AVG(R1ref) is a reference average output value of pixels in one of the two light-shielded areas under certain conditions taken prior to imaging; and
AVG(R2ref) is a reference average output value of pixels in another one of the two light-shielded areas under certain conditions taken prior to imaging.

14. A method for correcting an output of a pixel of a pixel array of an image sensor, wherein the pixel array comprises an imaging area and two light-shielded areas across the imaging area and the pixel is in the imaging area, using following equation:

$$OUT(x, y) = IN(x, y) - AVG(R1, R2) - \{LUT(x, y) - AVG(R1ref, R2ref)\} * Slope + C;$$

wherein:
OUT(x,y) is an output of a pixel at a coordinate (x,y);
IN(x,y) is an output before correction of the pixel at the coordinate (x,y);
AVG(R1,R2) is an average output value at imaging of pixels in the two light-shielded areas taken during imaging;
LUT(x,y) is a predetermined black level reference of the pixel at the coordinate (x,y);
AVG(R1ref,R2ref) is a reference average output value of pixels in the two light-shielded areas under certain conditions taken prior to imaging;
Slope is determined by average output values at imaging of pixels in the two light-shielded areas, respectively, taken during imaging and reference average output values of pixels in the two light-shielded areas under certain conditions, respectively, taken prior to imaging; and
C is a constant.

15. The method according to claim 14, wherein the Slope is determined as:

$$\{AVG(R2) - AVG(R1)\}/\{(AVG(R2ref) - AVG(R1ref)\};$$

wherein:
AVG(R1) is an average output value at imaging of pixels in one of the two light-shielded areas taken during imaging;
AVG(R2) is an average output value at imaging of pixels in another one of the two light-shielded areas taken during imaging;
AVG(R1ref) is a reference average output value of pixels in one of the two light-shielded areas under certain conditions taken prior to imaging; and
AVG(R2ref) is a reference average output value of pixels in another one of the two light-shielded areas under certain conditions taken prior to imaging.

16. The method according to claim 14, wherein the Slope is determined as:

$$\{AVG(R2) + AVG(R1)\}/\{(AVG(R2ref) + AVG(R1ref)\};$$

wherein:
AVG(R1) is an average output value at imaging of pixels in one of the two light-shielded areas taken during imaging;
AVG(R2) is an average output value at imaging of pixels in another one of the two light-shielded areas taken during imaging;

AVG(R1ref) is a reference average output value of pixels in one of the two light-shielded areas under certain conditions taken prior to imaging; and AVG(R2ref) is a reference average output value of pixels in another one of the two light-shielded areas under certain conditions taken prior to imaging.

\* \* \* \* \*